United States Patent [19]

Jayakumar

[11] Patent Number: 6,108,781
[45] Date of Patent: *Aug. 22, 2000

[54] BOOTSTRAP PROCESSOR SELECTION ARCHITECTURE IN SMP SYSTEM

[75] Inventor: Muthurajan Jayakumar, Sunnyvale, Calif.

[73] Assignee: Intel Corporation, Santa Clara, Calif.

[ * ] Notice: This patent is subject to a terminal disclaimer.

[21] Appl. No.: 09/256,689

[22] Filed: Feb. 23, 1999

Related U.S. Application Data

[63] Continuation of application No. 08/904,109, Jul. 31, 1997.
[51] Int. Cl.[7] .............................. G06F 15/177; H02H 3/05
[52] U.S. Cl. .................................... 713/2; 714/30
[58] Field of Search ................................ 713/2, 1; 714/30

[56] References Cited

U.S. PATENT DOCUMENTS

| | | | |
|---|---|---|---|
| 5,450,576 | 9/1995 | Kennedy | 713/1 |
| 5,495,569 | 2/1996 | Kotzur | 714/2 |
| 5,642,506 | 6/1997 | Lee | 713/1 |
| 5,673,388 | 9/1997 | Murthi | 714/42 |
| 5,675,772 | 10/1997 | Liu | 703/27 |
| 5,724,527 | 3/1998 | Karnik | 710/128 |
| 5,758,325 | 5/1998 | Lohry | 705/12 |
| 5,768,585 | 6/1998 | Tetrick | 713/2 |
| 5,790,850 | 8/1998 | Natu | 713/2 |
| 5,860,002 | 1/1999 | Huang | 713/2 |
| 5,862,151 | 1/1999 | Fagerness | 714/30 |
| 5,867,702 | 2/1999 | Lee | 713/2 |
| 5,904,733 | 5/1999 | Jayakumar | 713/2 |
| 6,009,521 | 12/1999 | Huang | 713/1 |

*Primary Examiner*—Joseph E. Palys
*Assistant Examiner*—Willie Martin
*Attorney, Agent, or Firm*—Leo V. Novakoski

[57] ABSTRACT

A method is provided for selecting a bootstrap processor from among the processors of a multiprocessor system. Each processor has an identity code and each processor that is eligible to serve as the bootstrap processor sends an election message to processors having lower valued identity codes. If no processor having a lower valued identity code responds to the election message, the processor that originated the election message designates itself as the bootstrap processor and sends a message to all processors indicating itself as the bootstrap processor.

9 Claims, 7 Drawing Sheets

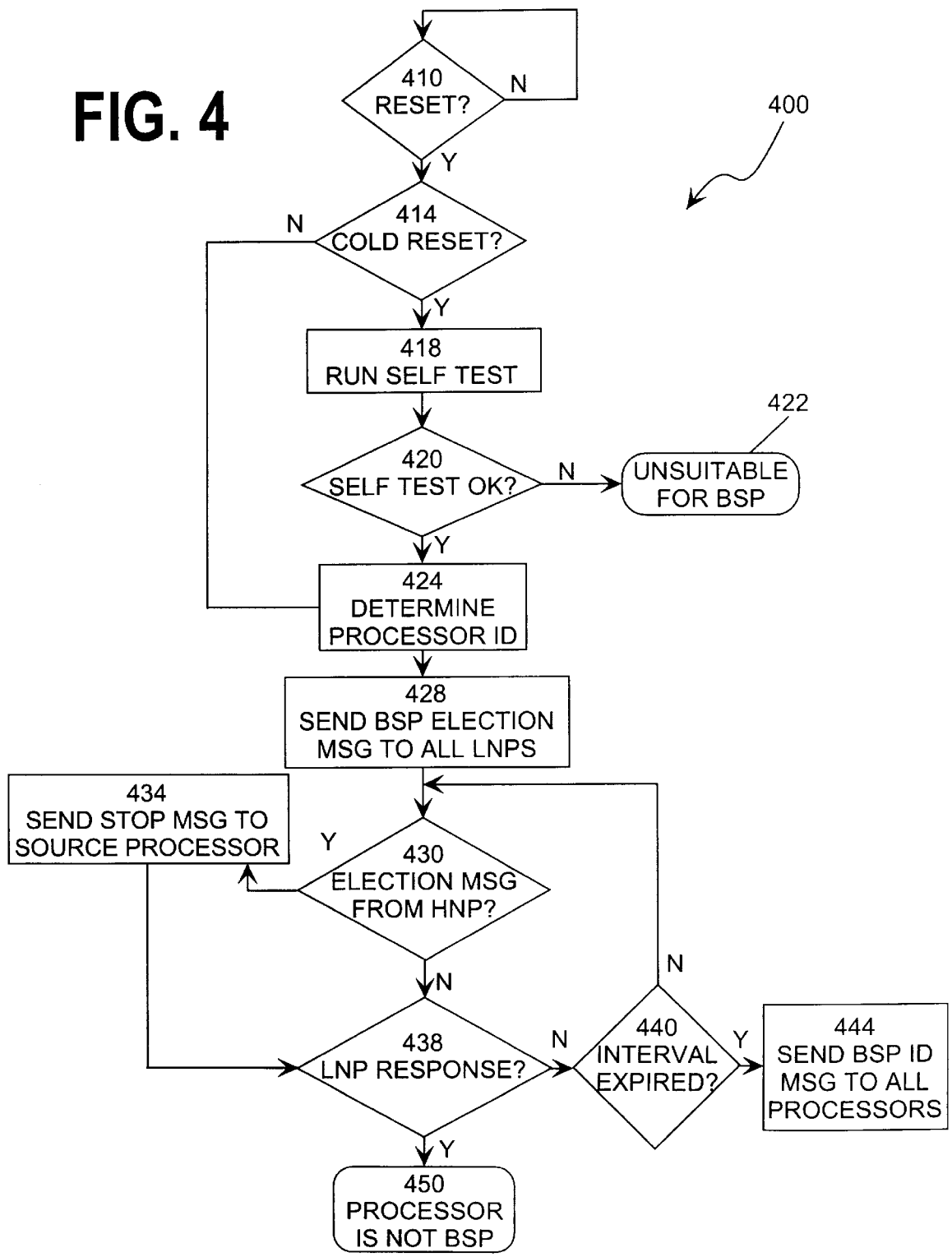

BOOTSTRAP PROCESSOR SELECTION ARCHITECTURE IN SMP SYSTEM

This application is a continuation of Ser. No. 08/904,109 filed Jul. 31, 1997.

BACKGROUND OF THE INVENTION

1. Technical Field

This invention relates to the field of multi-processor systems, and in particular to systems and methods for selecting a bootstrap processor in multi-processor systems.

2. Background Art

Advanced computer systems increasingly rely on multiple processors to provide the computational power necessary to meet the demands of the applications they run. In these systems, processing functions are distributed among the component processors to minimize bottle-necks at any one processor. One approach to multi-processing that has been especially successful treats each processor in the system as equivalent. These systems are referred to as symmetric multi-processor (SMP) systems since the different processors are indistinguishable for purposes of scheduling and executing code. This equivalency greatly facilitates the balancing of work loads among the processors and simplifies the requirements of the operating system. Since all processors are treated as equivalents for executing threads, additional processors may be added to SMP systems without altering the software. This ability to increase the system's processing power easily by adding resources, e.g. processors, is referred to as scalability.

An element of asymmetry in SMP systems is introduced by the need to select a single processor to bootstrap the system. At system start-up and whenever the system is reset, each processor in an SMP system typically is responsible for determining that its internal components and interfaces are functioning properly. The bootstrap processor (BSP) is unique in that it handles initialization procedures for the system as a whole. These procedures include checking the integrity of memory, identifying properties of the system logic, loading the operating system into memory, and starting the remaining processors. Since these functions temporarily introduce asymmetry into SMP systems by assigning a unique role to the BSP, it is desirable to make the selection of the BSP as symmetric as possible.

Conventional systems employ a variety of techniques for selecting a BSP from among the processors of an SMP system. In one SMP system, the processors are coupled through a dedicated, open collector interrupt bus. On reset, each processor asserts an inverted form of an assigned processor identification number (processor ID) onto a shared line of the interrupt bus. As soon as a processor asserting a one on the line detects that another processor is asserting a zero, the first processor relinquishes the line. The processor that survives this arbitration procedure is the processor having the highest valued processor ID. This processor gains control of the bus and sends a message to all processors on the interrupt bus, identifying itself as the BSP. This approach is exemplified by SMP systems based on the Pentium® Pro microprocessor of Intel corporation.

There are a number of short-comings in this approach to BSP selection. It requires a dedicated interrupt bus. This bus is relatively slow by the standards of today's processor speeds, making the boot process unnecessarily slow. In addition, each bus can only support clusters of up to four processors. Additional processors must be accommodated in separate clusters, and the need for a dedicated interrupt bus makes it difficult to extend the method across multiple clusters.

Another method for selecting the BSP simply designates the processor in a specified slot as the BSP. This strategy introduces a permanent asymmetry into the SMP system, and if the processor in the designated slot fails, no mechanism is provided for designating a different processor as the BSP.

Other methods for selecting BSPs in SMP systems identify the first processor to write to a shared variable as the BSP. In one of these SMP systems, a semaphore is stored at a specified address in memory, and the first of the system's processors to successfully read & set the semaphore value is designated as the BSP. This method, however, requires the use of memory before memory has been tested for reliability by the BSP.

An alternative semaphore-based method has the processors of the SMP system write to a non-volatile memory location, which is usually a register on the system logic or chip set. In this alternative, the chipset includes a read/write register for each processor in the SMP system and a shared register that is accessible to all processors. The processor registers and shared register act together as a semaphore for a critical section of code that must be executed by the BSP. Various algorithms are employed to ensure that only one processor executes the critical code and that this processor's ID is saved in the shared register to identify the BSP.

This method requires that the number of processors in the system be known ahead of time, since a register must be provided in the chipset for each. This limits the scalability of the SMP system and requires additional logic in the chipset for storing the processor ID of the first processor that writes to its assigned register into the shared memory location. It also requires coordination between the chipset logic and the processors prior to boot.

Thus, there is a need for a system and method for selecting a bootstrap processor in a multi-processor system that is scaleable and that can be implemented quickly by the processors of the system, without coordination with memory, the chipset logic, and other implementation dependent components of the multi-processor system.

SUMMARY OF THE INVENTION

The present invention provides scaleable bootstrap processor (BSP) selection in a multi-processor system without requiring additional system hardware, access to untested system components during the bootstrap process, or advanced knowledge of the number of processors in the system. The BSP is selected through a distributed message-passing method that operates independently of the number of processors in the system.

In accordance with the present invention, each processor is characterized by a processor identification code (processor ID). When a processor detects a reset condition, it generates a bootstrap message to each processor having a lower-valued processor ID. If the processor does not receive a bootstrap message from a processor having a lower-valued processor ID, it operates as the BSP.

In one embodiment of the invention, instructions representing the method passing method are stored in a non-volatile memory location and bootstrap messages are passed on a high speed system bus that couples the processors of the multi-processor system to system components such as memory and chipset logic.

BRIEF DESCRIPTION OF THE DRAWINGS

The present invention may be understood with reference to the following drawings in which like elements are indicated by like numbers. These drawings are provided to illustrate possible embodiments of the present invention and are not intended to limit the scope of the invention.

FIG. 4 is a detailed flowchart of a bootstrapping process including a method for selecting the BSP in accordance with the present invention.

DETAILED DESCRIPTION OF THE INVENTION

When a computer system is first turned on (cold boot or reset), or when it is restarted without turning the power off (warm boot or reset), it must run a series of tests to determine the identity and status of its component parts, load essential software, e.g. the operating system, and establish communications among the component parts. This start-up process is referred to as bootstrapping or booting to reflect the fact that the system turns itself on incrementally. Typically, the individual processors each test their components and interfaces. One processor is then selected from their number to establish communications with the rest of the system and complete the system-wide steps of the bootstrapping process. The selected processor is the bootstrap processor. In Intel processors and processors compatible with the Intel architecture, the bootstrapping process is initiated by asserting a reset signal that is input to each processor. The present invention is not limited to a specific reset signal or condition, and may be implemented with any of the reset indicators employed by various processor architectures.

The present invention is a system and method for selecting a bootstrap processor (BSP) in a multi-processor system without reference to memory, chipset logic, and other platform components, and without need for dedicated buses or logic devices. In one embodiment, component processors of the multi-processor system communicate among themselves and with a non-volatile memory location using a system bus. The invention is implemented through inter-processor messages in the form of inter-processor interrupts (IPIs), power management interrupts (PMIs), and comparable communication protocols.

The BSP selection process of the present invention allows any processor in the system to be designated as the BSP, substantially preserving the symmetry of the multi-processor system. The selection process is also readily applicable to systems that are organized as clusters of processors. For example, the present invention may be used to first identify a BSP from each cluster ("cluster BSP") and then to select among the cluster BSPs to identify a single system BSP. If the clusters are themselves organized in a hierarchical fashion, the present invention may be employed to identify a BSP at each level of the hierarchy until a single, system-wide BSP is identified.

The selection process of the present invention may also be combined with other BSP selection processes to accelerate BSP identification. For example, it may be faster to designate a processor at a specified slot location as the tentative BSP. If the processor at this slot fails or its performance degrades below a specified level, the present invention may be used to select a new BSP from among the remaining processors.

Figure 1:
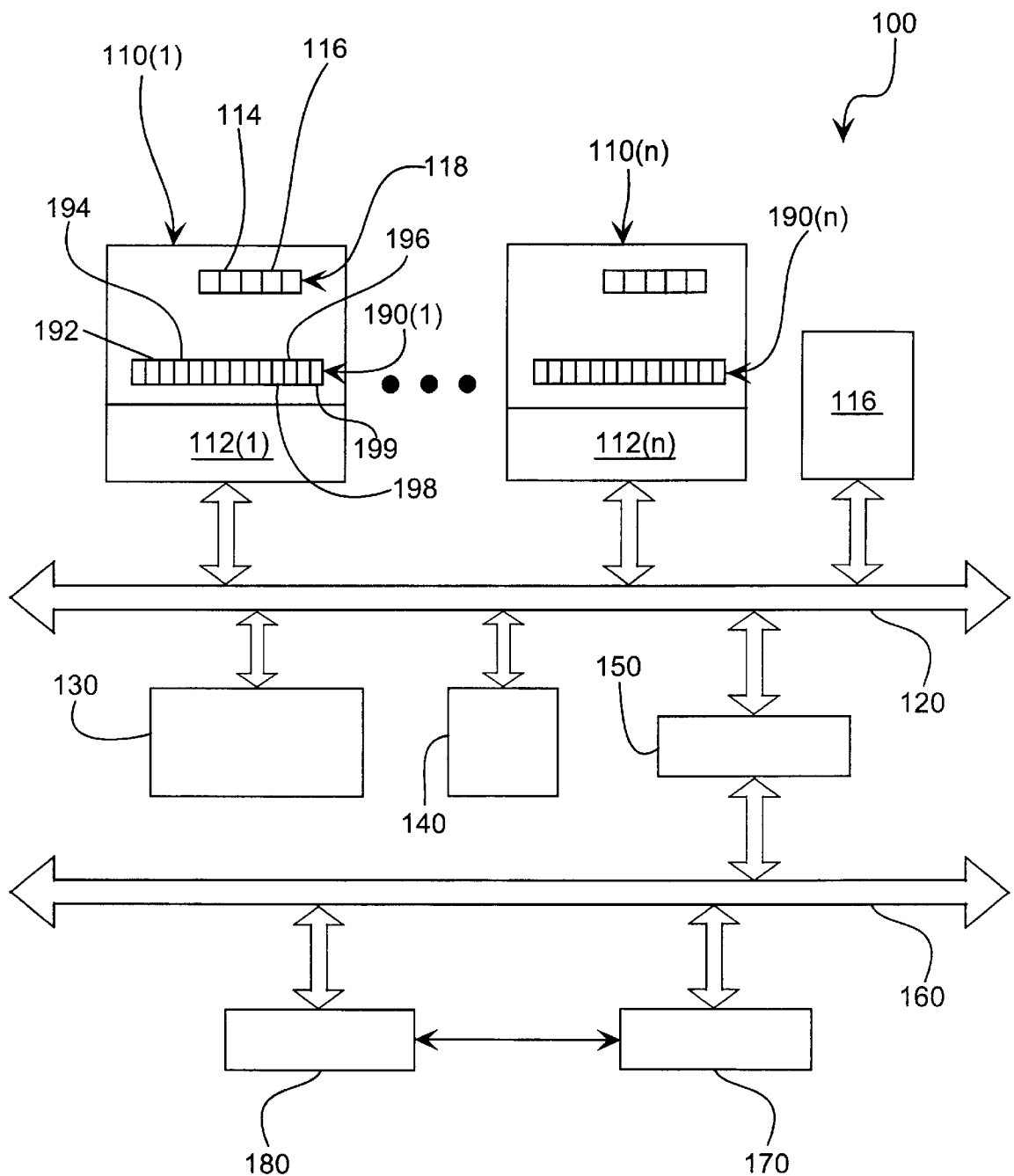
FIG. 1 is a block diagram of a multi-processor system suitable for implementing the BSP selection method of the present invention.

Referring first to FIG. 1, there is shown an embodiment of a multi-processor system (MPS) 100 suitable for implementing the BSP selection process of the present invention. In the disclosed embodiment, MPS 100 comprises processors 110(1)–110(n), a memory 130, and a non-volatile memory 140, all of which communicate through a system bus 120. Each processor 110(1)–110(n) includes a local interrupt controller 112(1)–112(n), respectively. Interrupt controllers 112(1)–112(n) handle the interprocessor interrupts (IPIs), processor management interrupts (PMIs), and other interrupt-based messaging formats employed for communicating among processors 110(1)–110(n). In the following discussion, indices are dropped from references to processors 110(1)–110(n), local interrupt controllers 112(1)–112(n), and other indexed elements unless the discussion applies to a specific processor 110, local interrupt controller 112, or index element, respectively.

For completeness, MPS 100 is also shown including other components that are typically present in computer systems. These include a bus bridge 150, I/O bus 160, I/O interrupt controller 170 and I/O chip-set 180. Bridge 150 couples I/O bus 160 to system bus 120 so that I/O devices (not shown) may communicate with devices on system bus 120, such as processors 110, memory 130, and non-volatile memory 140. I/O interrupt controller 170 and I/O chip-set 180 route interrupts from I/O devices to processors 110

Non-volatile memory 140 typically stores various procedures used by processors 110 when MPS 100 is first turned on or when MPS 100 is reset by a software or hardware event. Non-volatile memory 140 is used in these cases because data stored in it persists even when power to MPS 100 is cut off. In addition, until memory 130 has been tested and determined to be reliable, it is risky to rely on the data stored there. In one embodiment of the present invention, the BSP selection method implemented by processors 110 is stored in non-volatile memory 140 and accessed through system bus 120. This eliminates the need to store BSP routines in the form of microcode on the processors.

Local interrupt controller 112 is a unit of processor 110 which is used to send and receive inter-processor interrupts and related interrupt-based signals. Communications between local interrupt controller 112 and processor 110 occur through registers 190 and an interrupt delivery region 114 of a processor I/O address block 118. For example, during boot, processor 110 may generate an IPI by writing interrupt data and an interrupt command to interrupt delivery region 114 of I/O address block 118. Processor 110 communicates with non-volatile memory 140 via system bus 120 through another region 116 of I/O address block 118 assigned to memory 140.

Registers 190 include a local ID register (LID) 192, an interrupt vector register (IVR) 194, a task priority register (TPR) 196, an end of interrupt register (EOI) 198, and interrupt request registers IRR 199. LID 192 stores a processor ID code or number of processor 110. The processor ID code may be set by a number of methods including, for example, assigning the ID through the system BIOS or reading the state of selected input pins (not shown) when a reset event is detected. In each case, the method ensures that each processor 110 on bus 120 has a unique processor ID.

Registers 190 provide control over external and I/O related interrupts, and track the status of pending interrupts. In one embodiment, IVR 192 stores an indication of the highest priority interrupt pending for processor 110. TPR 196 stores a priority value necessary to interrupt the procedure currently being executed by processor 110. EOI 198 stores a value indicating when an interrupt has been processed, and IRR 199 stores the pending, i.e. not yet serviced, interrupts for processor 110.

In the disclosed embodiment, processors 110 form the core of MPS 100 and the boot process typically begins with each of processors 110 running a built in self test (BIST) when a reset signal is detected asserted. BIST is used to determine the status of the processor's functional units and interfaces, including, for example, the processor's local interrupt controller 112 Thereafter, one of processors 110 is selected as the bootstrap processor (BSP) 110. The BSP coordinates testing of the rest of MPS 100 and loads the operating system from memory 130 or some other storage device such as a hard drive or floppy drive (not shown) accessed through I/O bus 160. These and other boot procedures are typically initiated through a power on self test or POST.

The reliability of memory 130 and the data paths between memory 130 and processors 110 are not tested until the BSP has been selected and the POST run,. Accordingly, the self test programs run by processors 110 and boot procedures run by the BSP are typically stored in static memory devices as non-volatile memory 140. Since static memory devices maintain the integrity of their data even when power to MPS 100 is turned off, the data does not have to be reloaded into each time MPS 100 is powered on. Non-volatile memory 140 is typically a read only memory (ROM) device such as an electrically erasable and programmable ROM (EEPROM) or flash memory. In some processors, BIST and POST procedures or parts of these procedures may be stored as microcode on the processor itself. However, available capacity on the processor is typically limited and storage in non-volatile memory 140 is preferred.

In addition to being powered on from the off-state (cold boot or reset), MPS 100 may be reset when it is already powered on (warm boot or reset). In this case, processors 110 may not be required to run their BISTs, and other parts of the cold boot procedure may also be by-passed. However, a BSP must still be selected from among processors 110 and various POST procedures must still be run. The event that triggers reset may be caused by failure of the BSP itself, in which case selection of a new BSP is imperative.

Figure 2:
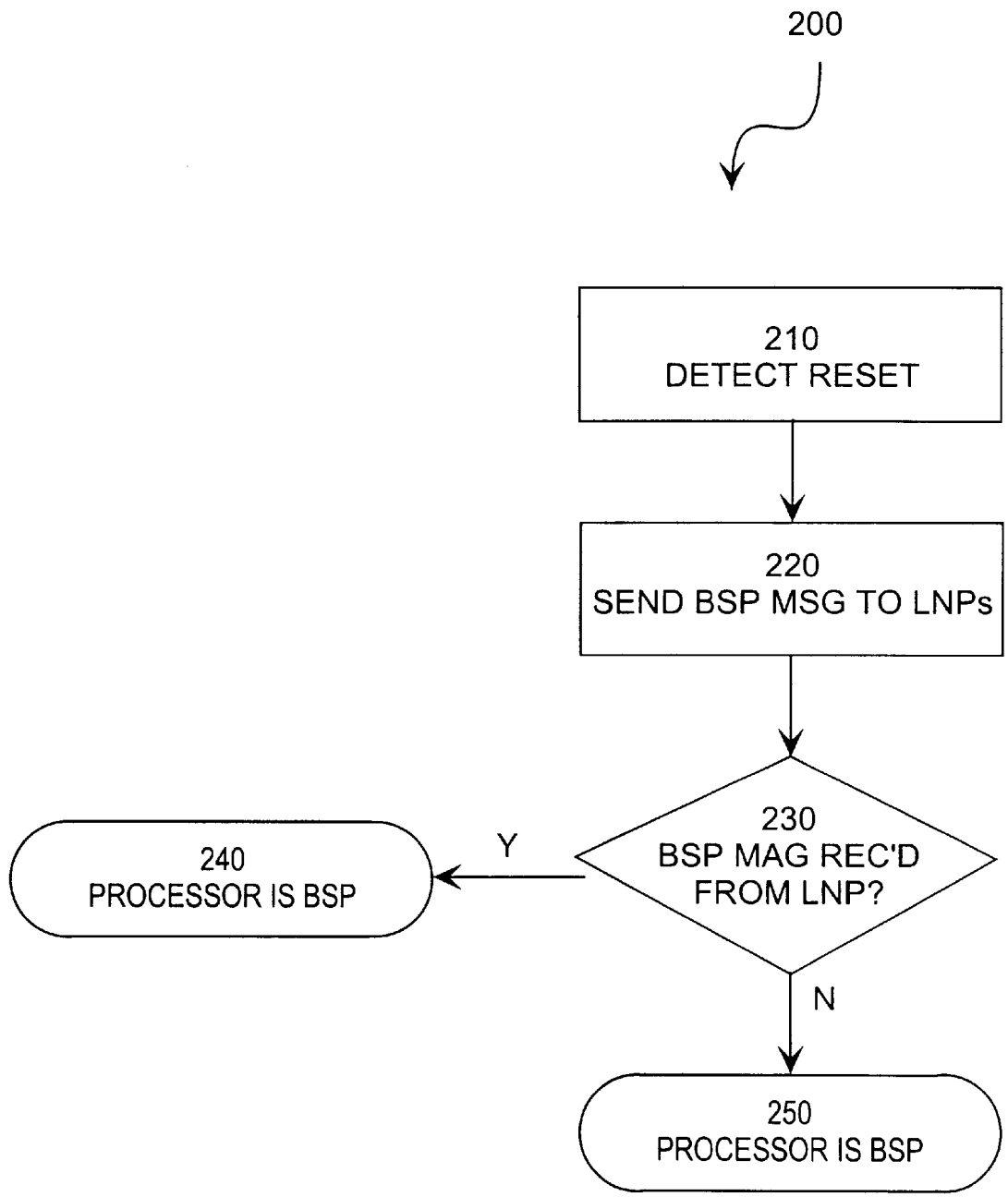
FIG. 2 is a flow chart showing an overview of the method for selecting a bootstrap processor in the multiprocessor system of FIG. 1.

Referring now to FIG. 2, there is shown an overview of a method 200 in accordance with the present invention for selecting a BSP from among the processors of a MPS. For example, method 200 may be implemented by each processor 110 that is available to operate as the BSP in MPS 100. In a fully symmetric MPS, this will be all functional processors 110 in the system, e.g. all processors 110 that successfully run their BIST. Method 200 provides a fast, reliable, and flexible way to identify the processor having the lowest-valued processor ID in a multi-processor system and designates that processor as the BSP. In the following discussion, the processor ID is assumed to be a numeric value for purposes of illustration. More generally, the processor ID may be an alphabetic code, an alphanumeric code, or any code that may be ordered according to some value assignment.

Method 200 is initiated when a reset signal is asserted as a result of an external or internal event. As each processor detects 210 an asserted reset signal, it sends 220 a BSP message that includes its processor ID to all processors having lower valued processor IDs, e.g. all lower numbered processors or LNPs. For example, in an eight processor system 100, processor 110(3) sends a BSP message to processors 110(2) and 110(1). Processor 110(3) does not send a BSP message to processors 110(4)–110(8).

The processor then waits 230 for a responsive message from an LNP. If no responsive message is received 230, the processor proceeds as if it is the lowest numbered processor operating in the system and designates 250 itself as the BSP. On the other hand, receipt 230 of a responsive message from an LNP indicates that the processor 110 is not the lowest numbered processor in the system, whereupon it relinquishes 240 its claim to BSP status.

By sending BSP messages only to lower numbered processors, method 200 eliminates the need to know the total number of processors in the system. This allows additional processors 110 to be added to MPS 100 without requiring any change to the boot process. Moreover, each processor need only respond when it receives a message from a processor having a higher ID number, i.e. a higher numbered processor or HNP.

As noted above, the messages used in the selection of BSP from among processors 110 are typically interrupt-based messages. These messages are preferably transmitted on system bus 120 rather than on a slower, dedicated interrupt bus. In one embodiment of the invention, each functional processor generates a bootstrap IPI (BIPI) to each LNP when it detects reset pin. In the disclosed embodiment of MPS 100, each processor 110 generates a BIPI by writing an interrupt command to interrupt delivery region 114 of I/O address block 118. BIPIs and other IPI messages are broadcast on system bus 120 and each processor reads an identity field in the message to determine if it is the target.

Figure 3A:
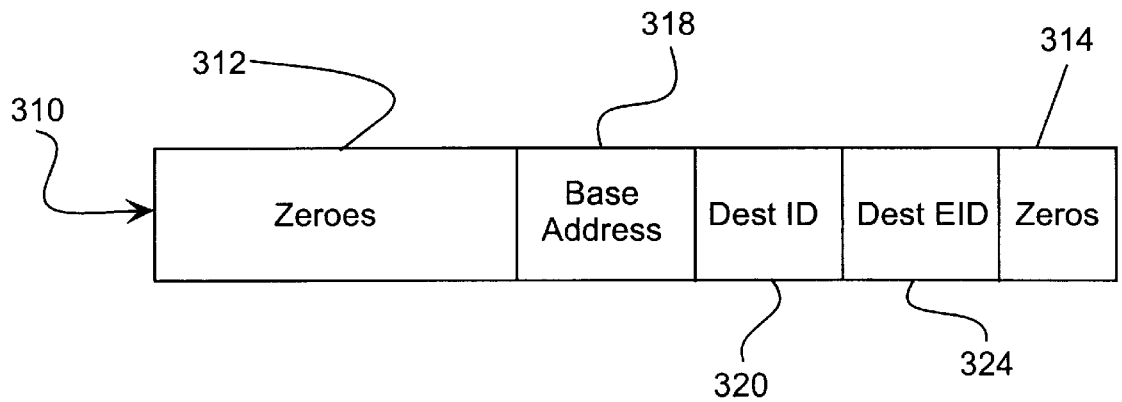
FIGS. 3A and 3B are block diagrams of message-passing instructions in one embodiment of the present invention.

Referring now to FIG. 3A, there is shown an embodiment of an interrupt command 310 suitable for use in the present invention. In this embodiment, fields 312 and 314 are all zeroes, field 318 indicates a base address for the processor I/O block and fields 320 and 324 indicate the ID and Extended ID (EID) of the processor to which the IPI is directed. For example, in a multi-processor system comprising 32 processors organized in 8 clusters of 4-processors each, base address field 318 indicates a base address in I/O address space assigned to the cluster in which the targeted processor is located, and ID and EID fields 320, 324, respectively, provide an offset from base address 318 that is assigned to the targeted processor. In one embodiment of the invention, when the IPI is generated on system bus 120, each processor 110 reads fields 318, 320, and 324 to determine if it is the intended recipient.

Figure 3B:
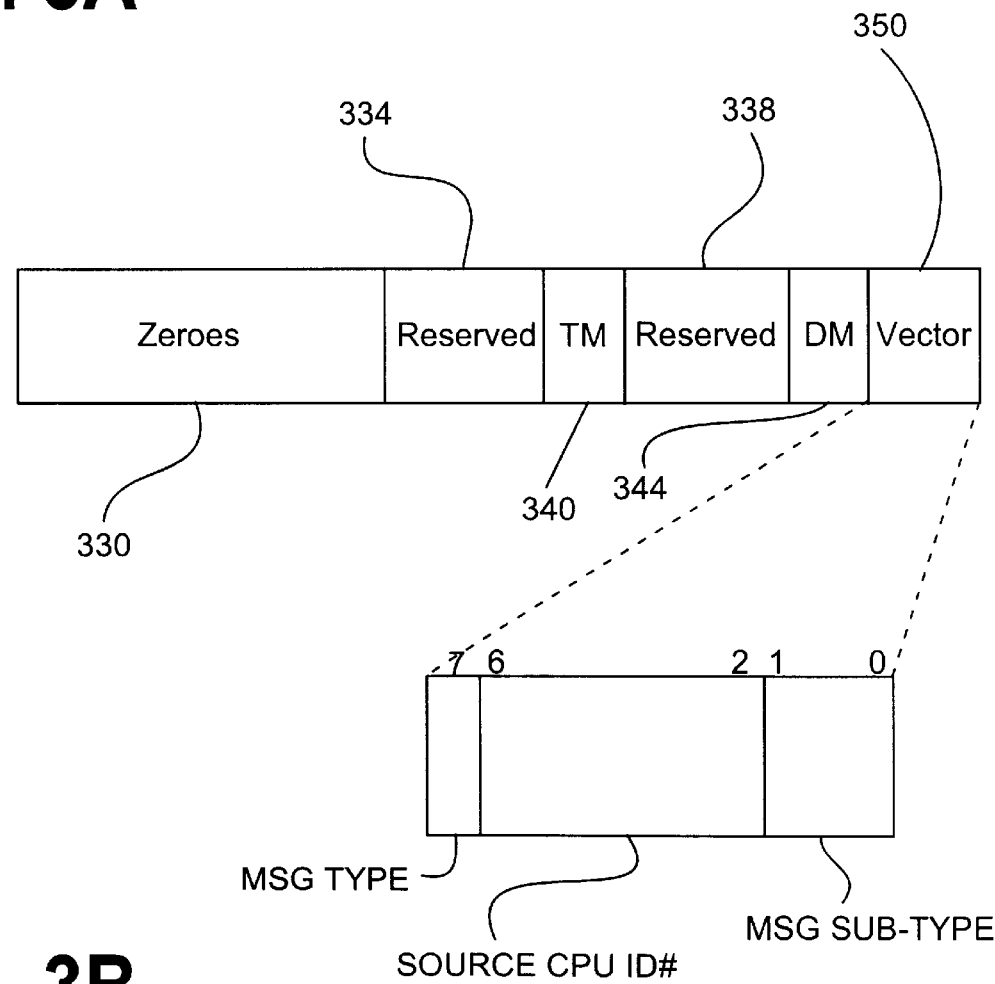

Data used to generate the IPI is stored in a format indicated by FIG. 3B. In this embodiment, field 330 is all zeroes, fields 334 and 338 are reserved, field 340 indicates a trigger mode (TM) for the interrupt, field 344 indicates the delivery mode (DM) for the interrupt, and field 350 identifies the type of interrupt being sent. The trigger mode of an interrupt (field 340) indicates whether the interrupt is initiated by an edge or a level on the appropriate processor pin. The delivery mode of an interrupt (field 344) indicates how local interrupt controllers 112 should act upon receipt of the IPI. In one embodiment of the invention, the interrupt may be signaled by asserting an interrupt (INTR), a non-maskable interrupt (NMI), a processor management interrupt (PMI), or an initialization (INIT) pin on the targeted processor.

Referring still to FIG. 3B, there is shown an embodiment of field 350 suitable for specifying the type of interrupt being sent. In this embodiment, a one-bit field at bit 7 indicates whether the message (MSG) is a BSP message. For example, bit 7 may be set to 1 to indicate a BSP message type and set to zero to indicate all other message types. Bits 2 through 6 are used to indicate the ID # of the processor that is sending the message. The two-bit field at bits 0 and 1 indicate a sub-type for the message. For example, a BSP type message may be a BSP election message (00), a BSP stop message (01), or a BSP selected message (10). A BSP election message is the message that is sent to all lower numbered processors by a processor (source processor) when it detects reset asserted. A processor receiving a B SP election message from a higher numbered processor responds with a BSP stop message to indicate to the source processor that a lower numbered processor is present and, consequently, the source processor is not the BSP. A BSP selection message is sent by the processor determined to have the lowest numbered (valued) processor ID to indicate to the processors that it is the BSP.

A processor determines that no lower numbered processors are available to function as the BSP when it fails to receive a BSP stop message from a lower numbered processor. In one embodiment of the invention, a processor will wait for such a message for a selected interval after sending its BSP election message(s). If the interval times-out before a responsive message is received, the processor sends a BSP selection message to all other processors, indicating that BSP selection has completed and identifying itself as the BSP processor. In one embodiment of the present invention, interrupt handlers for bootstrapping routines, including routines used to generate different BSP messages, are stored in non-volatile memory 140 at entry points indicated by field 350.

Method 200 is not limited to the disclosed configurations of interrupt controller 112, registers 190, or commands. 310, but may be implemented using a variety of message handling hardware and message formats.

Referring now to FIG. 4, there is shown a detailed flowchart of a BSP process 400 including a BSP selection method in accordance with the present invention. Process 400 is implemented by each processor in a MPS that may be designated as the BSP. Process 400 is initiated when a reset is detected 410. If the reset is determined 414 to be a cold reset, e.g. one generated when the system is first powered on, then a BIST is run 418 to ensure that the processor is functioning properly. The processor is deemed 422 unsuitable to operate as the BSP if the BIST indicates 420 that it is not fully operational. A processor that successfully runs its BIST begins the message passing sequence necessary to select a BSP at step 424. If a warm reset is detected 414, indicating that the system is already powered on, it is typically not necessary to run the BIST and the processor jumps directly to state 424.

The processor determines 424 its processor ID number to identify itself in its BSP messages to other processors and to determine which of the other processors will receive its BSP election messages. In particular, at step 428 the processor sends a BSP election message to each processor in the system having a processor ID number lower than its processor ID number. In the disclosed embodiment of the invention, processor 110 uses local interrupt controller 112 to handle message passing on system bus 120, under control of routines stored in non-volatile memory 140.

In addition to sending 428 BSP election messages to lower numbered processors, the processor checks 430 for election messages from HNPs and sends 434 a stop message to any HNPs detected this way. The processor also checks 438 for messages sent by LNPs in response to the processor's election message, e.g. a stop message from an LNP. If an LNP responds 438, the processor is not the lowest numbered processor in the system and relinquishes 450 its claim to BSP status. If no LNP message is received, the processor checks 440 an interval timer to determine whether a selected interval has expired. If it has not expired, the processor continues checking for messages from HNPs (state 430) and LNPs (state 438). If the interval has expired 440, the processor sends a BSP selected message to all processors, identifying itself as the BSP.

Figure 5A:
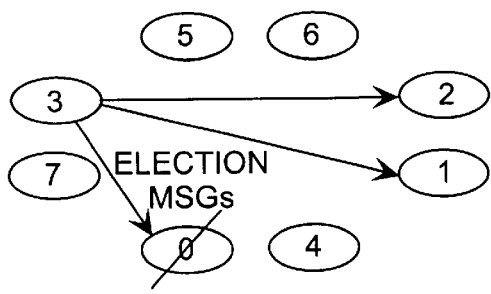
FIGS. 5A–5F sent selected stages in the bootstrap processor selection method illustrated in FIG. 4.
Figure 5B:
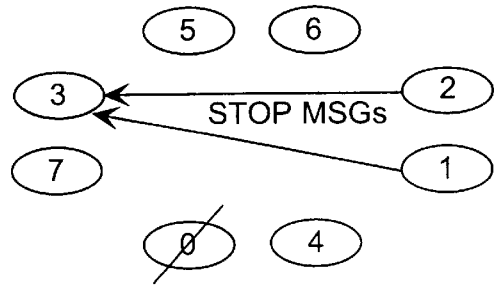
Figure 5C:
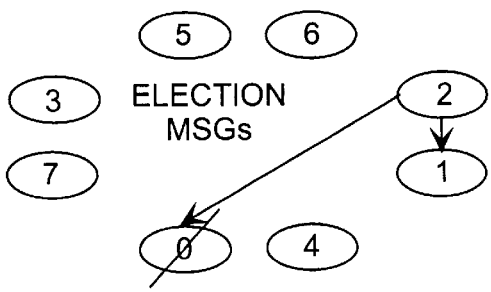
Figure 5D:
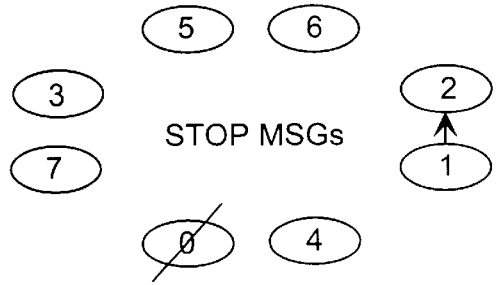
Figure 5E:
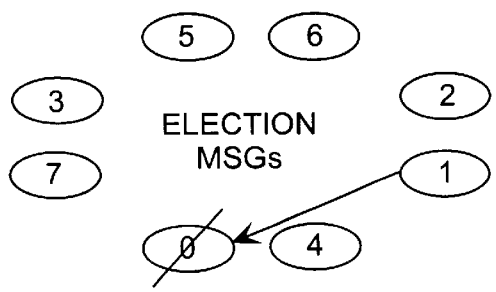
Figure 5F:
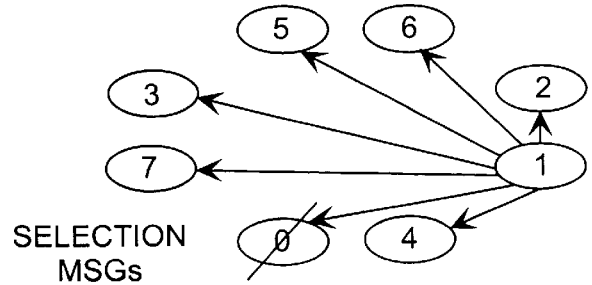

Referring now to FIGS. 5A–5F, there are shown the steps in the BSP selection of the present invention for a group of eight processors (P0–P7). In this example, BSP selection is initiated when the current BSP (P0) crashes, and P3 sends out BSP election messages to LNPs P2, P1, and P0 (FIG. 5A). Since P2 and P1 have lower ID numbers than P3 and are currently functional, they respond to P3 with Stop messages (FIG. 5B). P2 then sends out election messages to LNPs P1 and P0 (FIG. 5C), and P1 responds with a Stop message (FIG. 5D). Since P0 is no longer functional, P1s election message to P0 elicits no response (FIG. 5E), and P1 sends out a BSP selection message to inform the processors that it is the new BSP (FIG. 5F).

It is noted that the arbitration scheme implicit in FIGS. 5A–5F grants the system bus to processors P0–P7 in descending order of their processor IDs. This is a round-robin arbitration scheme that is often used in SMP systems, but the present invention may operate with a wide variety of arbitration schemes. In the disclosed example, P3 initiated the message passing because it was next in the round robin rotation.

The BSP illustrated in FIGS. 4 and 5 has been described using specific message types, e.g. BSP election, stop, and selected messages, but it is not limited to these messages. For example, any sort of handshaking protocol that allows processors in a MPS to identify the lowest number processor that is currently operational may be employed to implement the present invention.

The present invention has been described for the situation in which the BSP selection process is the same for both cold and warm resets. While this process is relatively efficient, it is likely to be slower than designating a default processor as the BSP, since the latter approach eliminates the message passing steps of methods 200, 400. However, simply designating a BSP processor is insufficient by itself because the designated BSP may fail, in which case a flexible method is required to select a new BSP.

Figure 6:
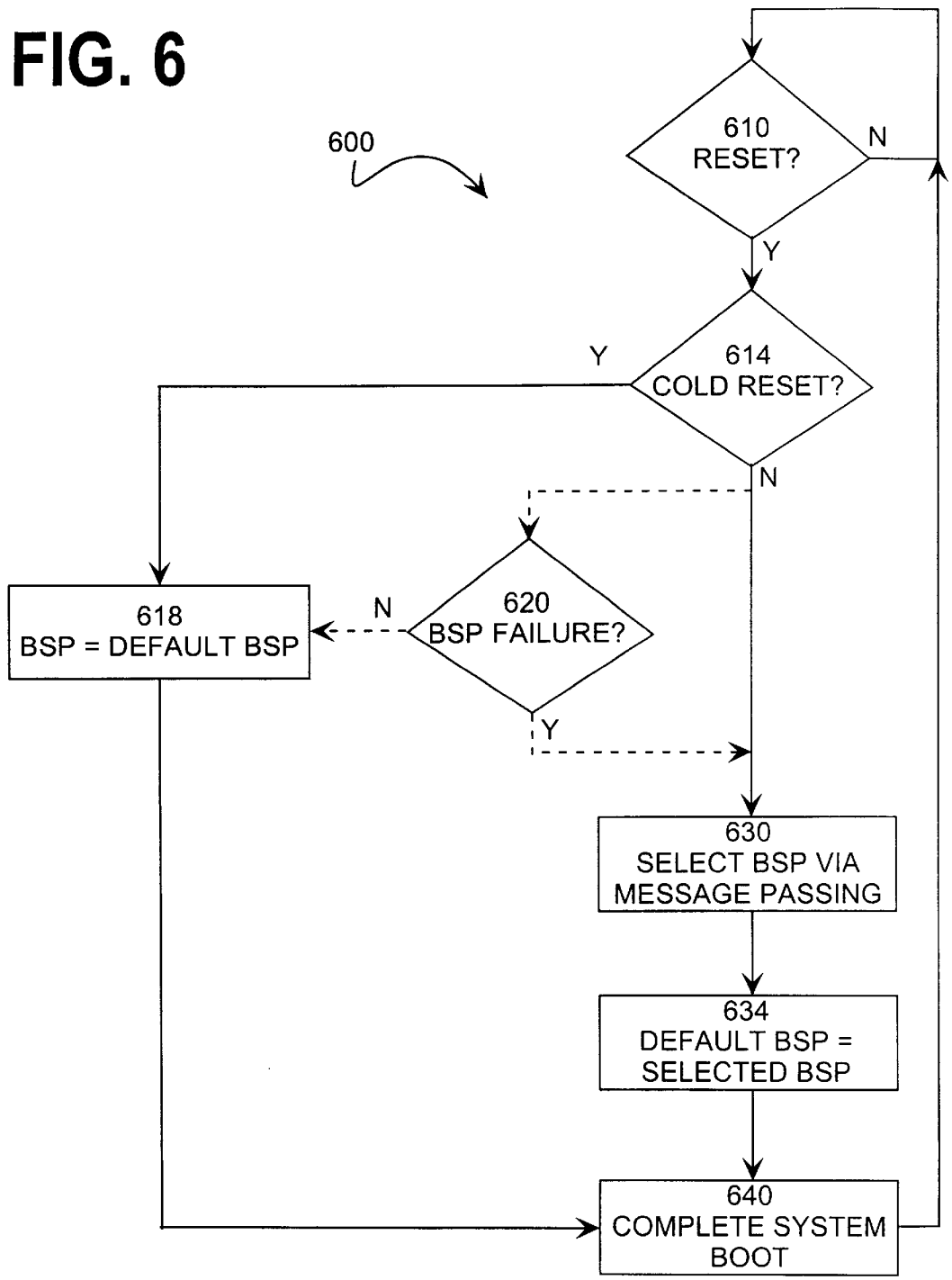
FIG. 6 is a flowchart of a bootstrap processor selection method incorporating the method of the present invention.

Referring now to FIG. 6, there is shown an embodiment of the present invention that combines flexible BSP selection with default designation of the BSP. In this embodiment, a method 600 begins when a reset is detected 610 and proceeds to determine 614 whether the reset was a cold reset, i.e. generated when the system is powered off, or a warm reset, i.e. generated while the system was already powered on. If the reset is determined 614 to be a cold reset, a default processor is designated 618 as the BSP. This may be done, for example, by storing the processor ID of the designated BSP in a non-volatile memory location and reading the ID when a cold boot is detected. Initially, the designated BSP may be the processor in a selected location (processor slot) of the system logic 116.

If it is determined 614 that a warm reset occurred, the BSP is selected 630 by the message passing method indicated in FIGS. 2 and 4. That is, each processor sends BSP election messages to all LNPs (with respect to the sending processors ID #), and any LNPs that are currently operational respond with BSP stop messages. By design, the lowest numbered processor that is currently operational will not receive a BSP stop message, and following a time-out interval, this processor notifies the other processors of its status via a BSP select message. In step 634, once the BSP has been selected, it is designated as the default BSP by storing its processor ID # in the designated non-volatile memory location. At step 640 the BSP, whether the default processor or the one selected by message passing (step 630), completes the boot process and returns to state 610.

This embodiment of method 600 assumes that a warm reset means that the current BSP has failed and employs message passing to identify a new BSP. However, all warm resets are not caused by failure of the BSP. An alternative embodiment of method 600 (indicated by dashed lines) recognizes this by adding an additional test (step 620) before implementing message passing. In particular, the alternative embodiment of method 600 determines 620 whether the warm boot was caused by failure of the BSP. If not, the default BSP is again designated 618 as the BSP. If so, method 600 proceeds to step 630 et seq. to select a new BSP from among the remaining operational processors.

The BSP selection method of the present invention is readily scaleable, due in part to the fact that each processor only communicates with lower numbered processors. The scalability of the invention is also due in part to the fact that the method can be applied in a hierarchical manner to clusters of processors, clusters of clusters of processors, etc. For example, large multiprocessor based systems may have hundreds of processors organized into clusters. In these systems, the clusters themselves may be organized into groups of clusters. For example, a multi-processor system comprising 200 processors may be organized into 25 groups of processor clusters, each of which clusters comprises 8 processors. Large systems may further organize the groups of clusters into super-groups, as necessary to coordinate system operations.

In these very large systems, a BSP is selected for each grouping, using the methods of FIG. 2 and 4. In the example provided above, a cluster BSP processor is selected for each cluster of 8 processors. The resulting 25 cluster processors then exchange BSP messages according to methods 200, 400, and 600. In this case, clusters will be identified using, for example, base address field 318 of FIG. 3A. Each cluster BSP will send a message to the cluster BSP of each lower numbered cluster (lower numbered EID) and await a responsive message. The cluster BSP that does not receive a stop BSP message will be the BSP for the system as a whole. As noted above, this method can be readily adapted to cover additional configurations and hierarchies of processors in multi-processor systems.

Figure 7:
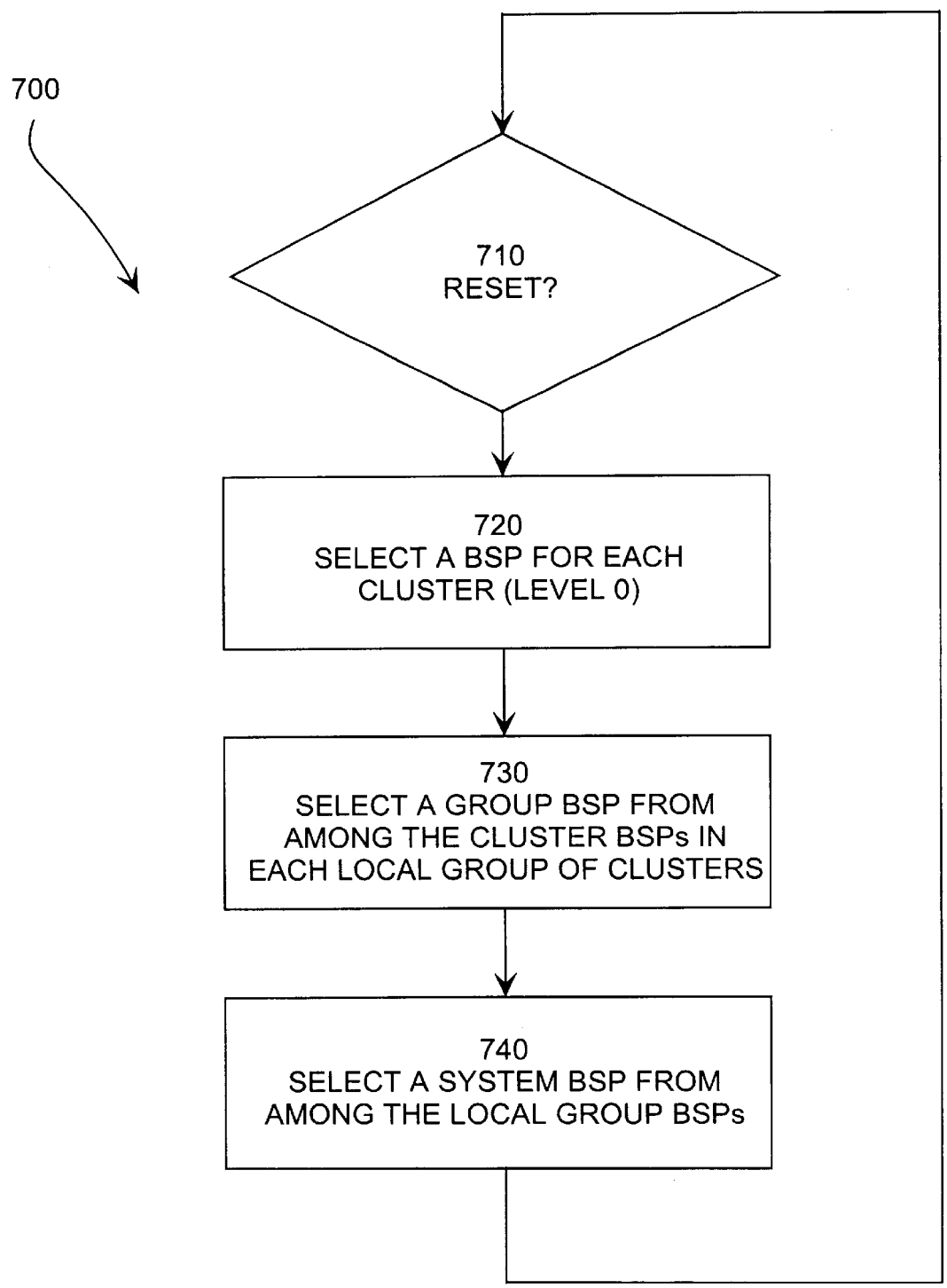
FIG. 7 illustrates a method for selecting a bootstrap processor in a hierarchical multiprocessor system that incorporates the method of the present invention.

Referring now to FIG. 7, there is shown a method for selecting a BSP from among the processors of a multiprocessor system that is organized into multiple local groups of clusters. When reset is detected 710, a BSP is selected 720 for each cluster, using the method of the present invention. Once a BSP has been selected for each cluster, a local group BSP is selected 730 for the local group of clusters, again using the method of the present invention. When a local group BSP has been selected for each local group of clusters, a system BSP is be selected 740 in accordance with the present invention from among the local group BSPs. Method 700 is clearly extensible to hierarchical structures having additional levels of organization.

There has thus been presented a system and method for selecting a bootstrap processor from among the processors of a multi-processor system. When a reset event occurs, each processor sends an election message to all lower numbered processors in the system (or in its local system if the stem is organized hierarchically). If the processor receives no response from a lower numbered processor, it designates itself as the BSP and sends a message to all processors in the system indicating its status.

The present invention has been described with reference to a particular system (FIG. 1) and in terms of particular message types (FIGS. 3A, 3B, 4, and 5). These descriptions are intended to be exemplary rather than limiting. Persons skilled in the art, having the benefit of this disclosure, will recognize variations of the disclosed method and system that fall within the scope of the appended claims.

What is claimed is:

1. A method for selecting a bootstrap processor (BSP) in a multiprocessor (MP) system that includes a plurality of processors which communicate via a system bus, each processor including a register to store a processor identification (ID) having a value, the method comprising:

detecting a reset signal by each functional processor and responding by:

sending a first message, which includes the processor ID of the functional processor, across the system bus to all processors with processor IDs having values lower than the value associated with the functional processor; and waiting an interval for a responsive message from one of the lower valued processors;

if the responsive message is not received within the interval, the functional processor being selected as the BSP.

2. The method according to claim 1, further comprising:

sending, by a functional processor having a lowest value processor ID, a selection message across the system bus, the selection message indicating that the functional processor having the lowest value processor ID is the BSP.

3. The method according to claim 1, wherein if the responsive message is received within the interval, then the functional processor being identified and not the BSP.

4. The method according to claim 1, further comprising:

running a built-in, self-test routine by each of the processors.

5. The method according to claim 1, further comprising the step of:

storing the processor ID of the BSP in a non-volatile memory location of the MP system.

6. A storage medium on which is stored data for execution by one or more processors in a multiprocessor (MP) system, the processors communicating via a system bus with each processor including a register to store a processor identification (ID) having a value, execution of the data implementing a method by each of the processors which are functional in the MP system comprising:

sending a first message, which includes the processor ID of the functional processor, across the system bus to all processors with processor IDs having values lower than the value associated with the functional processor; and waiting a selected interval for a responsive message from one of the lower valued processors;

if the responsive message is not received within the selected interval, the functional processor being selected as bootstrap processor (BSP);

otherwise, the functional processor being identified as not the BSP.

7. A multiprocessor system, which comprises:

a plurality of processors, each processor including a register to store a processor identification (ID) having a value;

a system bus coupled to the plurality of processors; and a memory device coupled to the system bus; and wherein each of the processors further includes logic for selecting a bootstrap processor (BSP), the logic operating responsive to a reset signal to send a first message, which includes the processor ID of the processor, across the system bus to all processors with processor IDs having values lower than the value associated with the processor; the processor then waiting a selected interval for a responsive message from one of the lower valued processors; if the responsive message is not received within the selected interval, a functional processor being selected as the BSP; otherwise, the functional processor being selected as not the BSP.

8. The MP system of claim 7, further comprising a memory device that stores the processor ID of the BSP.

9. The MP system of claim 7, wherein each processor further includes a local interrupt controller for handling interrupt messages.

* * * * *

UNITED STATES PATENT AND TRADEMARK OFFICE
CERTIFICATE OF CORRECTION

PATENT NO.   : 6,108,781                                  Page 1 of 1
DATED        : August 22, 2000
INVENTOR(S)  : Jayakumar It is certified that error appears in the above-identified patent and that said Letters Patent is hereby corrected as shown below:

Column 5,
Line 31, after "devices" and insert -- such --.

Column 7,
Line 37, after "commands" delete -- . --.

Column 10,
Line 57, delete "of the processors which are functional" and insert
-- functional processor --.

Signed and Sealed this

Eighth Day of January, 2002

Attest:

JAMES E. ROGAN
*Attesting Officer*                *Director of the United States Patent and Trademark Office*